(12) United States Patent
Sumioka

(10) Patent No.: US 7,955,786 B2
(45) Date of Patent: Jun. 7, 2011

(54) PRODUCTION OF A MULTILAYER OPTICAL RECORDING MEDIUM USING A STAMPER

(75) Inventor: Yukari Sumioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/103,955

(22) Filed: Apr. 16, 2008

(65) Prior Publication Data

US 2008/0261148 A1 Oct. 23, 2008

(30) Foreign Application Priority Data

Apr. 23, 2007 (JP) ................................ 2007-112991

(51) Int. Cl.
*G11B 7/24* (2006.01)
(52) U.S. Cl. .................... 430/321; 430/320; 264/1.33
(58) Field of Classification Search .................. None
See application file for complete search history.

(56) References Cited

U.S. PATENT DOCUMENTS

| 5,279,689 | A * | 1/1994 | Shvartsman | 156/220 |
|---|---|---|---|---|
| 7,819,653 | B2 * | 10/2010 | Yokoyama | 425/385 |
| 2001/0019753 | A1 * | 9/2001 | Ohno et al. | 428/64.1 |
| 2002/0031632 | A1 * | 3/2002 | Hisada et al. | 428/64.4 |
| 2004/0004300 | A1 * | 1/2004 | Yamaguchi et al. | 264/1.33 |
| 2005/0063289 | A1 * | 3/2005 | Tomiyama et al. | 369/270.1 |
| 2005/0226999 | A1 * | 10/2005 | Kouchiyama et al. | 427/162 |
| 2006/0159001 | A1 * | 7/2006 | Imanishi | 369/275.4 |
| 2007/0105055 | A1 * | 5/2007 | Shirasagi et al. | 430/320 |
| 2007/0117046 | A1 * | 5/2007 | Tomiyama et al. | 430/270.11 |
| 2007/0238055 | A1 * | 10/2007 | Shirasagi | 430/320 |
| 2010/0086880 | A1 * | 4/2010 | Saito et al. | 430/325 |

FOREIGN PATENT DOCUMENTS

| JP | 01-188332 | | 7/1989 |
|---|---|---|---|
| JP | 05-028540 | * | 2/1993 |
| JP | 2002-279707 | * | 9/2002 |
| JP | 2003-203402 | | 7/2003 |
| JP | 2007-035232 | * | 2/2007 |
| WO | 2007/086484 | * | 8/2007 |

OTHER PUBLICATIONS

Aoki et al., "A low noise durable transmissive stamper for multilayer discs using phase transition mastering", Proc. SPIE vol. 6282 pp. 62821L-1 to 62821L-10 (2006).*

Shinya Abe et al., "Dual Layer BD-ROM Disc Mastered with Electron Beam Recording," Matsushita Technical Journal, vol. 50, No. 5, 1-2 (2004) and Translation of item 3.2, $1^{st}$ and $2^{nd}$ paragraphs and Fig. 4.

* cited by examiner

*Primary Examiner* — Martin J Angebranndt
(74) *Attorney, Agent, or Firm* — Fitzpatrick, Cella, Harper & Scinto

(57) ABSTRACT

Provided is a light transmissive stamper having light transmissivity with respect to an ultraviolet ray and durability for repeated use. Specifically, on a light transmissive substrate, a light transmissive auxiliary layer and an inorganic resist layer are formed sequentially, and a light beam is selectively irradiated to the inorganic resist layer, to thereby modify an inorganic resist ranging from a surface of the inorganic resist layer to a surface of the light transmissive auxiliary layer. Then, a part modified by the light beam or an unmodified part is selectively removed until the light transmissive auxiliary layer is exposed, thereby forming an uneven pattern corresponding to an information pattern in the inorganic resist layer.

1 Claim, 7 Drawing Sheets

UV LIGHT SOURCE

PRODUCTION OF A MULTILAYER OPTICAL RECORDING MEDIUM USING A STAMPER

BACKGROUND OF THE INVENTION

1. Field of the Invention

The present invention relates to a production method of an optical recording medium. In particular, the present invention relates to a production method of a multilayer optical recording medium, in which a photocurable resin is applied to a substrate by employment of spin coating or the like so as to stack a recording layer, a light transmissive stamper for producing a multilayer optical recording medium, and a production method thereof.

2. Description of the Related Art

As information recording/reproducing technology with a high density, an optical recording medium such as a CD, DVD, and a Blu-ray (registered trademark) Disc (BD) is attracting a great deal of attention. In recent years, in association with a movement toward digitalization of a moving image and a movement toward miniaturization of an apparatus, there are demands for a higher recording density and a larger capacity.

In general, it is known that the recording density of an optical recording medium largely depends on the wavelength $\lambda$ of a laser beam and the numerical aperture (NA) of an objective lens of a recording/reproducing optical system. In other words, the spatial frequency of recording pits capable of reproducing a signal is about $2 NA/\lambda$. Accordingly, a number of studies have been conducted on the high recording density achieved by employment of a short wavelength technology or a high NA technology. For example, a CD has a recording capacity of about 650 MB when the wavelength of a laser beam for recording/reproduction is 780 nm and the NA of a lens is 0.45. A DVD-ROM has a capacity of about 4.7 GB when the wavelength of a laser beam is 650 nm and the NA of a lens is 0.6. Further, a BD has a capacity of more than 23 GB when the wavelength of a laser beam is as short as 405 nm and the NA of a lens is 0.85. Thus, the capacity of the optical recording medium has been increased.

On the other hand, more study has been conducted to realize a large capacity by stacking a plurality of recording surfaces. For example, a doubled recording capacity has been realized in, for example, a DVD and a BD, by stacking two layers of recording surfaces. With regard to the BD, a four-layered medium is under development aiming at higher integration to future generations.

Conventionally, as a production method of a multilayer optical recording medium, the following method has been employed. First, pits or guide grooves are formed in a surface of a substrate, and a reflective layer and a recording layer are formed thereon, to thereby form a first information recording layer.

After that, an ultraviolet curable resin (photocurable resin) or a dry photopolymer layer is formed on the first information recording layer (Step 1). A stamper which bears information (pits, guide grooves, or the like) necessary for the recording layer is superimposed on the ultraviolet curable resin or the dry photopolymer layer and cured so as to form pits or guide grooves, and the stamper is peeled (layer in which pits or guide grooves are formed is referred to as "intermediate layer") (Step 2). A translucent film is formed on the pits or the guide grooves, to thereby form a second information recording layer (Step 3). The above-mentioned steps are repeated so as to form a third recording layer and a fourth recording layer (for example, see Japanese Patent Application Laid-Open No. 2003-203402 and Matsushita Technical Journal Vol. 50 (No. 5), October 2004, pp. 64-68).

In this case, when the ultraviolet curable resin or the dry photopolymer is cured through the recording layer (translucent film), there occurs an attenuation of the irradiated ultraviolet ray. Accordingly, in the above-mentioned proposal, it is necessary to use a stamper (light transmissive stamper) having transmissivity with respect to the ultraviolet ray and to irradiate the ultraviolet ray from the stamper side.

As the light transmissive stamper, a stamper made of a resin is usually used, but it is difficult to reuse the stamper made of a resin from the viewpoint of necessity of maintaining productivity and quality. Accordingly, the stamper is disposed of each time a layer is formed, which poses a problem of increase of the cost.

Further, a method of forming a pattern corresponding to an information pattern in a glass material by etching, which is used as a light transmissive stamper has been proposed (see, for example, Matsushita Technical Journal Vol. 50 (No. 5), October 2004, pp. 64-68).

The production method of the light transmissive stamper made of glass is illustrated in FIGS. 3A to 3E. First, a photoresist 32 is uniformly applied to a quartz glass substrate 31 (see FIG. 3A). Next, on the photoresist 32, a latent image corresponding to an information pattern is formed using a light beam 33 (see FIG. 3B). Then, a development process is performed so as to obtain the photoresist 32 that bears a desired pattern (see FIG. 3C). The quartz glass substrate 31 is subjected to dry etching from a surface of the photoresist 32 by use of a $CF_4$ gas plasma 34, and the dry etching is stopped at a desired depth (see FIG. 3D). After that, the remaining photoresist 32 is removed by ashing with oxygen ($O_2$), to thereby obtain the light transmissive stamper made of glass (see FIG. 3E).

In the above-mentioned method disclosed in Japanese Patent Application Laid-Open No. H01-188332, the light transmissive stamper can be repeatedly used. However, in the case of producing the light transmissive stamper, it is necessary to manage complicated processes including a dry etching process and an ashing process. In addition, $CF_4$ gas and $CHF_3$ gas used in the dry etching process are greenhouse effect gasses, and thus their use is restricted and undesirable. Further, in the method, the pattern is directly formed on the glass substrate, so it is necessary to polish and regenerate the glass substrate when the glass substrate is reused.

SUMMARY OF THE INVENTION

In view of the above-mentioned circumstances, an object of the present invention is to provide a light transmissive stamper having light transmissivity with respect to an ultraviolet ray and durability for repeated use.

It is an object of the present invention to provide a light transmissive stamper having light transmissivity with respect to an ultraviolet ray and having durability for repeated use.

According to a first aspect of the present invention, there is provided a light transmissive stamper to be used, in production of a multilayer optical recording medium including a plurality of recording layers and a photocurable resin, for forming an information pattern in the photocurable resin, which includes: a substrate having light transmissivity; an auxiliary layer having light transmissivity stacked on the substrate; and an inorganic resist layer having light transmissivity stacked on the auxiliary layer, wherein peelability between the auxiliary layer and the photocurable resin is higher than peelability between the substrate and the photocurable resin, and wherein the inorganic resist layer has an uneven pattern formed therein corresponding to an information pattern, and the auxiliary layer having light transmissivity is exposed in a recess of the uneven pattern of the inorganic resist layer.

According to a second aspect of the present invention, there is provided a method of producing a light transmissive stamper to be used, in production of a multilayer optical recording medium including a plurality of recording layers and a photocurable resin, for forming an information pattern in the photocurable resin, which includes the steps of: forming an auxiliary layer having light transmissivity and an inorganic resist layer sequentially on a substrate having light transmissivity; selectively irradiating a light beam to modify an inorganic resist of the inorganic resist layer; and selectively removing, by development, one of a part of the inorganic resist that has been modified by the light beam and a part of the inorganic resist that is unmodified, until the auxiliary layer is exposed, wherein peelability between the auxiliary layer and the photocurable resin is higher than peelability between the substrate and the photocurable resin.

According to a third aspect of the present invention, there is provided a method of producing a multilayer optical recording medium having a plurality of recording layers, which includes the steps of:

a) forming a recording film on a substrate of an optical recording medium;

b) applying a photocurable resin for forming an intermediate layer, onto the recording film;

c) irradiating the photocurable resin for forming the intermediate layer with an ultraviolet ray through the light transmissive stamper set forth in claim 1 to transfer an information pattern to the photocurable resin for forming the intermediate layer; and d) stacking a recording film on the photocurable resin for forming the intermediate layer Further features of the present invention will become apparent from the following description of exemplary embodiments with reference to the attached drawings.

DESCRIPTION OF THE EMBODIMENTS

Figure 1A:
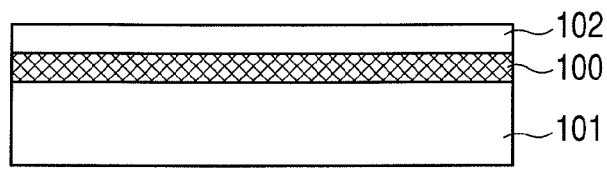
FIGS. 1A, 1B, 1C, 1D, and 1E are schematic cross-sectional views illustrating a production method of a light transmissive stamper and a production method of an optical recording medium according to the present invention.

In view of the above-mentioned problems, the present inventor has found a method of forming a pattern corresponding to an information pattern by use of an inorganic resist containing a tungsten oxide on a substrate having light transmissivity, to be used as the above-mentioned light transmissive stamper.

Incidentally, the term "light transmissivity" and "light transmissive" herein employed refers to a property of transmitting at least an ultraviolet ray.

Hereinafter, the light transmissive stamper will be described with reference to FIGS. 4A to 4F. An inorganic resist layer 42 is formed on a light transmissive substrate 41 (see FIG. 4A). The inorganic resist layer contains, as a main component, a tungsten oxide (hereinafter, abbreviated as "WO"), an oxide (hereinafter, abbreviated as "WMoO") in which a part of tungsten (W) of a tungsten oxide is substituted with molybdenum (Mo), a molybdenum oxide (hereinafter, abbreviated as "MoO"), each of which has an oxygen content less than the stoichiometric oxygen content of the oxide.

The state "having an oxygen content less than the stoichiometric oxygen content" herein employed refers to a composition with less oxygen content than that of the stoichiometric composition corresponding to the valence of W or Mo. Description will be made by taking the case of Mo as an example. Among the oxides of Mo, a trivalent oxide ($MoO_3$) is the most stable compound. When the oxidation state of the chemical formula $MoO_3$ is converted into a compositional ratio of $Mo_{1-x}O_x$, the stoichiometric composition is established in the case of x=0.75, and the composition in which the oxygen content is reduced from the oxygen content of the stoichiometric composition is obtained in the case of $0 \leq x<0.75$. An element of W or Mo can form various oxides with different valences. In this case, a composition with an actual oxygen content less than the oxygen content of a stoichiometric composition corresponding to an available valence corresponds to the state "having an oxygen content less than the stoichiometric oxygen content". For example, the oxides of Mo include not only the above-mentioned trivalent oxide ($MoO_3$), which is the most stable compound, but also a monovalent oxide. In this case, when the oxidation state is converted into the compositional ratio of $Mo_{1-x}O_x$, it can be said that the state "having an oxygen content less than the stoichiometric oxygen content" is obtained within a range of $0<x<0.5$.

In this case, WO, WMoO, or MoO used as a material of the inorganic resist layer has a considerably low absorbability with respect to a light beam in the state of the stoichiometric composition. However, when the oxygen content is reduced from that of the stoichiometric composition only by a small extent, the absorbability with respect to light beam becomes larger. Accordingly, WO, WMoO, or MoO, in which oxygen content is reduced from the stoichiometric oxygen content, absorbs light beam to generate heat. As a result, WO, WMoO, or MoO is modified, and there appears a difference between an exposed part (modified part) and an unexposed part (unmodified part) in solubility in an alkaline solution. The term "modification" herein employed refers to a change in phase state. The term "phase states" herein employed includes, for example, a crystalline state, an amorphous state, a transition state in which crystallinity increases from an amorphous state to a crystalline state, and a state in which different crystalline states are mixed with each other. The term "amorphous state" includes a state in which phase states with different densities are mixed with each other. The change in phase state includes a change from an amorphous state to a crystalline state, a change from a crystalline state to an amorphous state, a change in crystallinity in an amorphous state or in a crystalline state, and a change in density in an amorphous state.

For irradiation with a light beam, there can be employed, for example, a higher harmonic generator including a semiconductor laser, a gas laser such as an argon laser, and a YAG laser (solid laser). In the case of irradiating a light beam, the phase state of an inorganic resist can be changed by adjusting the irradiation conditions (power, irradiation speed, focusing conditions, and the like) of the light beam.

When a thin film formed of WO, WMoO, or MoO in which oxygen content is reduced from the stoichiometric oxygen content is subjected to exposure (condensing irradiation) with a light beam, the etch rate in an alkaline solution is changed. Accordingly, the thin film functions as a resist. Further, since the component of the inorganic resist is a low molecular component, a boundary between an unexposed part and an exposed part becomes clearer than a boundary of an organic resist formed of a polymer component, with the result that a resist pattern with high accuracy can be obtained.

By adjusting the composition (oxygen content) and film thickness of WO, WMoO, or MoO, there can be obtained a satisfactory absorptivity with respect to a light beam, and a transmittance sufficient for curing with respect to light (ultraviolet ray used when WO, WMoO, or MoO is used as stamper) used for curing a photocurable resin for forming an intermediate layer.

Further, WO can be allowed to function either as a positive resist or as a negative resist, by changing the film-forming conditions thereof to adjust the oxygen content therein. In addition, when Mo is added to WO, the sensitivity during the exposure can be improved.

Figure 4A:
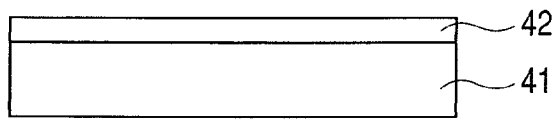
FIGS. 4A, 4B, 4C, 4D, 4E, and 4F are schematic cross-sectional views illustrating a production method of a light transmissive stamper formed of an inorganic resist according to the related art.
Figure 4B:
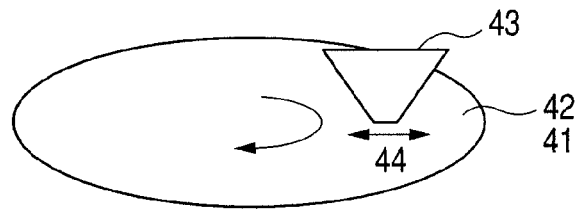
Figure 4C:
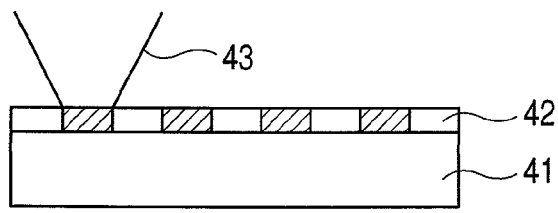
Figure 4D:
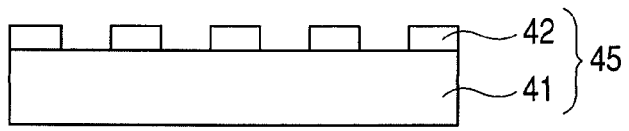
Figure 4E:
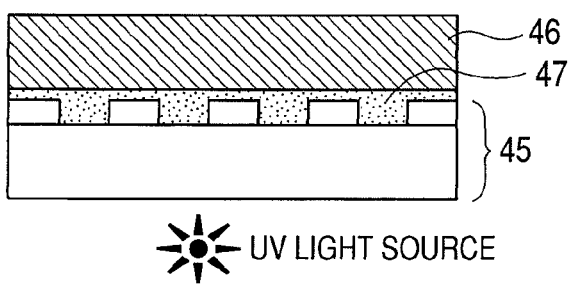
Figure 4F:
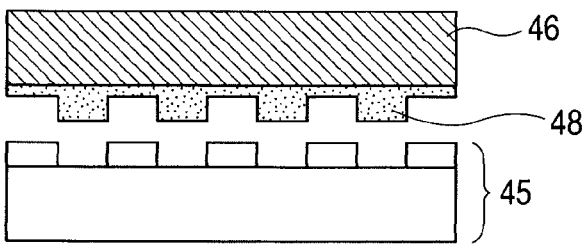

A description is given below of a production method of a multilayer optical recording medium by use of the light transmissive stamper. In this case, description will be made by taking, as an example, a case where WO is used as a positive resist. FIG. 4A illustrates a master disc of a light transmissive stamper having an inorganic resist layer 42 formed on a light transmissive substrate 41. Further, FIG. 4B illustrates a state of the master disc of the light transmissive stamper when obliquely viewed. First, a light beam 43 is converged on the inorganic resist layer, and the light beam is moved in a radial direction 44 of the light transmissive substrate while the light transmissive substrate is rotated, to thereby form an exposure pattern corresponding to an information pattern (pits or guide grooves) on the inorganic resist layer 42. By the condensing irradiation with the light beam, at least a part of an irradiated part of the inorganic resist is modified (see FIG. 4C). Next, development is performed under such conditions that a desired groove depth can be obtained, whereby an uneven pattern corresponding to the information pattern (pits or guide grooves) are obtained (see FIG. 4D). The uneven pattern corresponding to the information pattern (pits or guide grooves) is thus formed on the light transmissive substrate with the inorganic resist, which is used as a light transmissive stamper 45.

The light transmissive stamper can be produced by a simple method including film formation, exposure, and development, without using without using an electrocasting apparatus, a rear surface polishing apparatus, an injection molding machine, and an RIE apparatus which have been hitherto necessary for producing a transparent stamper. Further, since the low molecular resist is employed in the transparent stamper according to the present invention, it is possible to obtain an information pattern with high accuracy.

Next, a multilayer optical recording medium substrate (or support substrate) 46 having an intermediate layer-forming photocurable resin 47 applied thereto is superimposed on the light transmissive stamper 45. After that, an ultraviolet ray is irradiated through the light transmissive stamper 45, to thereby cure the intermediate layer-forming photocurable resin 47 (see FIG. 4E). Then, the light transmissive stamper 45 is peeled from the multilayer optical recording medium substrate 46, thereby enabling formation of an information pattern 48 on the photocurable resin 47. In this case, as the photocurable resin, there can be used a resin to be cured with an ultraviolet ray or visible light, such as an acrylic resin, a methacrylic resin, or an epoxy resin.

As described above, the resist layer of the light transmissive stamper is made of an inorganic material and is therefore excellent in durability. Accordingly, the light transmissive stamper is not degraded by irradiation with an ultraviolet ray and can be repeatedly used.

The light transmissive stamper has been described above. However, in the light transmissive stamper according to the present invention, there is a room for improvement of a pattern shape corresponding to a pit or groove from the viewpoint of a satisfactory quality of a reproduced signal.

Accordingly, the present inventor has further conducted extensive studies to provide a light transmissive stamper which has a satisfactory pattern shape corresponding to a pit or guide groove and can be repeatedly used for production of a multilayer optical recording medium.

As a result, it has been found that, in the light transmissive stamper, it is desirable to remove an inorganic resist part, which is modified by condensing irradiation with a light beam, to a level corresponding to a surface of the light transmissive substrate, from the viewpoint of a cross-sectional shape of grooves or pits.

Figure 5A:
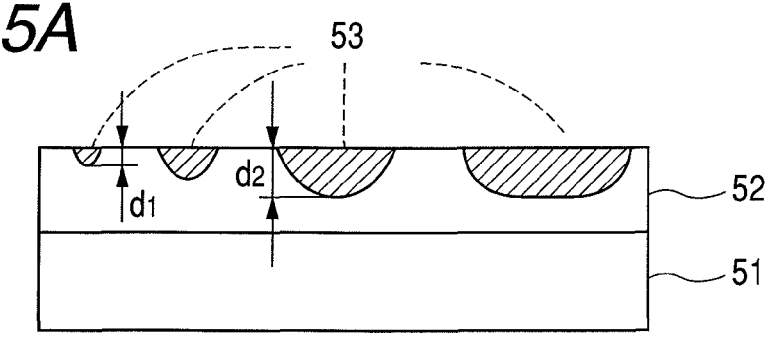
FIGS. 5A, 5B, 5C, and 5D are schematic cross-sectional views illustrating a light transmissive substrate and an inorganic resist layer, for illustrating a problem to be solved by the present invention.
Figure 5B:
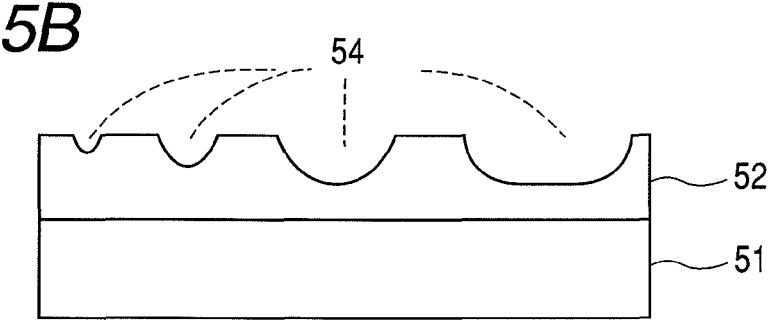

The above-mentioned point will be described with reference to FIGS. 5A to 5D. FIGS. 5A to 5D are schematic cross-sectional views illustrating a light transmissive substrate 51 and an inorganic resist layer 52 functioning as a positive resist that are viewed in a track direction. The inorganic resist layer is modified by heat generation due to the condensing irradiation with the light beam. For this reason, in the positive resist, in a case where a part subjected to the condensing irradiation of the resist is not removed to the level corresponding to the substrate surface, as illustrated in FIG. 5A, the depths of modified parts 53 are different from each other as indicated by reference symbols $d_1$ and $d_2$ depending on the length of a pit. Further, each pit or groove may have a cross-sectional shape which is poor in rectangularity and has a blunt edge part. Then, when the development is performed, as illustrated in FIG. 5B, pits 54 having shapes directly reflecting the shapes of the respective modified parts 53 are obtained. The production of an optical recording medium by use of the thus obtained light transmissive stamper leads to degradation of the reproduced signal.

Figure 5C:
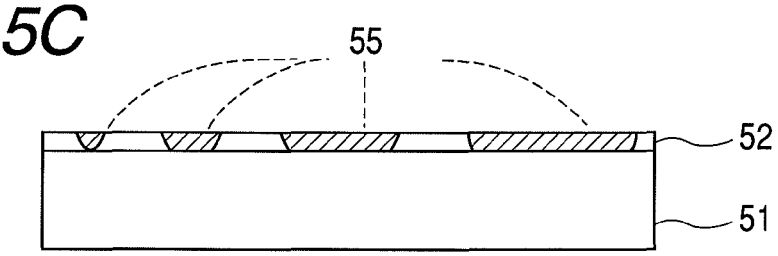
Figure 5D:
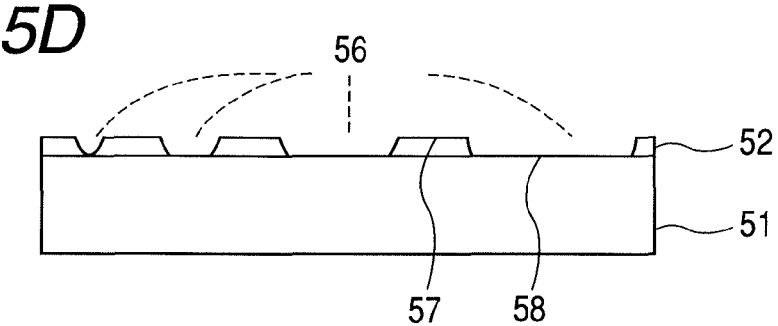

Accordingly, as illustrated in FIG. 5C, an inorganic resist layer is formed in advance so as to have, in a state after the development, a thickness that is identical to a desired depth of pits or grooves. After that, by modifying a region ranging from a surface of the inorganic resist layer to the substrate surface by condensing irradiation with a light beam, the depths of modified parts 55 are made uniform and the side walls of the modified parts 55 are formed at a steep angle. As a result, it has been found that, by etching the modified parts to the level of the substrate surface by development, the shapes of recesses 56 with a uniform depth can be obtained. Incidentally, the region ranging from the surface of the inorganic resist layer to the substrate surface can be modified by appropriately adjusting the wavelength, the power, and the linear velocity of the light beam, while the conditions may vary depending on the thickness or the composition (oxygen content, type of element) of the inorganic resist layer.

However, in this case, another problem has been found. In the light transmissive stamper in which the inorganic resist is removed to the level corresponding to the substrate surface, a substrate surface 58 is exposed. As a result, in the case of forming an intermediate layer of a multilayer optical recording medium, a photocurable resin comes into contact with both a resist surface 57 and the substrate surface 58. The adhesion between the substrate surface 58 and the photocurable resin is large, so that residues of the photocurable resin are more likely to remain on the substrate surface 58. The residues remaining on the light transmissive stamper lead to a defect of the optical recording medium to be subsequently produced, which results in degradation of the reproduced signal. Moreover, in the case where the inorganic resist is removed in the region reaching the level corresponding to the substrate surface, the area in which the inorganic resist is in contact with the substrate surface becomes smaller. As a result, the inorganic resist is more likely to be peeled off from the light transmissive substrate. Accordingly, when the photocurable resin is peeled from the light transmissive stamper, the inorganic resist is peeled together with the photocurable resin, which leads to a fear of damaging the light transmissive stamper.

As a countermeasure against such a problem, there can be employed a method of forming a release layer on the stamper surface after the production of the stamper. However, the method requires additional steps in which after the inorganic resist has been subjected to exposure and development as described above, the light transmissive stamper is carried into a vacuum evaporation system to form a release layer thereon.

In order to solve the above-mentioned problem, the present inventor has further conducted extensive studies and found that, when a light transmissive auxiliary layer excellent in peelability from the photocurable resin is formed between the inorganic resist layer and the light transmissive substrate, the peelability between the light transmissive stamper and the photocurable resin is improved, and the residues hardly remain on the light transmissive stamper. Further, since the adhesion between the inorganic resist layer and the light transmissive auxiliary layer is large, the inorganic resist is not peeled in the case of peeling the photocurable resin, so that the light transmissive stamper can be prevented from being damaged.

Hereinafter, embodiments of the present invention will be described. FIGS. 1A to 1E are schematic cross-sectional views illustrating a production method of a light transmissive stamper and a production method of an optical recording medium to which the present invention can be applied.

As illustrated in FIG. 1A, on a light transmissive substrate 101, a light transmissive auxiliary layer 100 and an inorganic resist layer 102 are formed.

As the light transmissive substrate 101, a glass substrate, a quartz substrate, a light transmissive ceramic substrate, and the like can be used as long as the substrate has a strength and transmittance sufficient for transferring an information signal pattern. For example, the light transmissive substrate 101 may have a thickness of 0.5 mm to 20 mm, a diameter of 80 mm to 120 mm, and a center hole diameter of 10 mm to 15 mm. In the examples described below, a description is given of an example where the light transmissive substrate 101 having a diameter of 120 mm and a center hole diameter of 15 mm, which are the same as those of a disc to be finally produced, is used. Further, in addition to the above-mentioned materials, any other materials and shapes can be used as long as the material has the above-mentioned characteristics.

As the light transmissive auxiliary layer 100, an inorganic oxide, an inorganic nitride, or a mixture thereof can be used. It is sufficient that the light transmissive auxiliary layer has an etch rate smaller than that of a part in which the inorganic resist is selectively removed, during development, and has a sufficient peelability from the photocurable resin when transferring the information pattern, as well as a sufficient transmittance for curing the photocurable resin. In this case, regarding the peelability required for the light transmissive auxiliary layer, it is necessary that the peelability between the light transmissive auxiliary layer and the photocurable resin in which the information pattern is formed is higher than at least the peelability between the light transmissive substrate and the photocurable resin. As the light transmissive auxiliary layer, there can be used, for example, a silicon nitride, a silicon oxide, a titanium oxide, and a tungsten oxide which are formed by sputtering. Any other materials can also be used as long as the material has the above-mentioned characteristics. In addition, the thickness of the light transmissive auxiliary layer 100 to be formed is not particularly limited as long as the conditions meet the above-mentioned characteristics. The thickness may be, for example, 1 nm to 500 nm.

As the material of the inorganic resist layer 102, WO, WMoO, or MoO each having an oxygen content less than the stoichiometric oxygen content can be used. The thickness of the inorganic resist layer 102 to be formed is not particularly limited as long as the thickness is selected so as to obtain a desired depth after the development, and may be, for example, 20 nm to 200 nm. In this case, the absorptivity of the inorganic resist with respect to a light beam is not limited, and the wavelength of the light beam is not limited either. The removal of the region ranging from the surface of the inorganic resist layer 102 to the surface of the light transmissive auxiliary layer 100 by the exposure and development can be performed by appropriately adjusting the conditions such as the composition of the inorganic resist, and the wavelength, the power, or the linear velocity of the light beam.

In this case, the light transmissive auxiliary layer 100 and the inorganic resist layer 102 are continuously formed in a vacuum by sputtering without being exposed to the atmosphere, whereby a sufficient adhesion between the light transmissive auxiliary layer and the inorganic resist layer can be obtained.

Figure 1B:
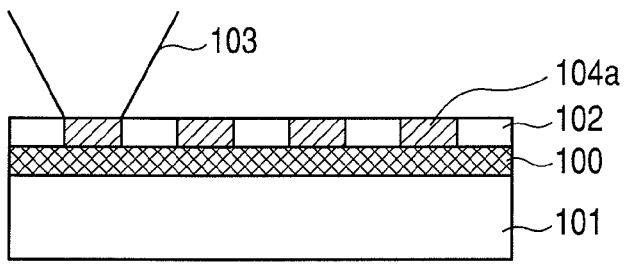

Next, as illustrated in FIG. 1B, a light beam 103 is converged on the inorganic resist layer, and the light beam is moved in the radial direction of the light transmissive substrate while the light transmissive substrate is rotated, to thereby modify the inorganic resist corresponding to an information pattern (pits or guide grooves) (modified parts 104a). In this case, the wavelength and output of the light beam are appropriately adjusted according to the composition of the inorganic resist and the thickness of the inorganic resist layer so that the region ranging from the surface of the inorganic resist layer to the surface of the light transmissive auxiliary layer can be modified.

Figure 1C:
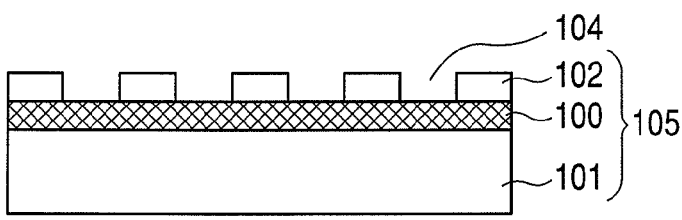

Further, as illustrated in FIG. 1C, development is performed until the surface of the light transmissive auxiliary layer 100 is exposed, to thereby obtain recesses 104 corresponding to the information pattern (pits or guide grooves). The etch rate of the light transmissive auxiliary layer is smaller than that of the part in which the inorganic resist is selectively removed, so that the light transmissive auxiliary layer functions as an etch stop layer. As a developer, for example, tetramethyl ammonium hydroxide (TMAH), KOH, NaOH, and the like can be used.

The resulting member in which the light transmissive auxiliary layer is formed on the light transmissive substrate, and the recesses 104 corresponding to the information pattern (pits or guide grooves) are formed in the inorganic resist formed on the light transmissive auxiliary layer, with the light transmissive auxiliary layer 100 being exposed at the bottom of the recesses 104 is used as a light transmissive stamper 105.

In the present invention, it is preferred that the thus obtained light transmissive stamper has a transmittance of 19% or more at a wavelength having a highest transmittance within a wavelength range of an ultraviolet ray to be irradiated for curing the photocurable resin.

Figure 1D:
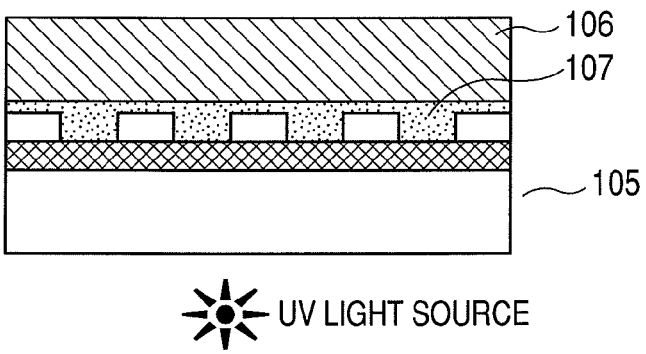
Figure 1E:
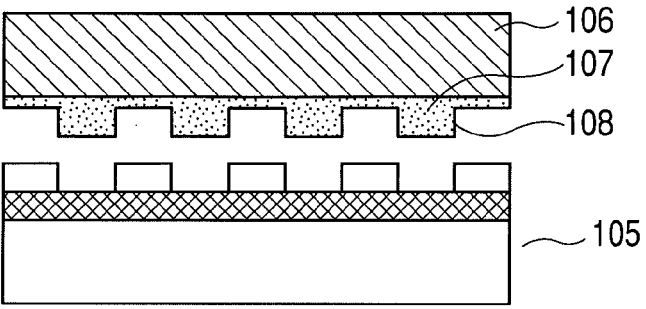

Then, as illustrated in FIG. 1D, for example, a multilayer optical recording medium substrate 106 having an intermediate layer-forming photocurable resin 107 of the multilayer optical recording medium applied thereto, is superimposed on the light transmissive stamper 105. After that, by the irradiation of the ultraviolet ray through the light transmissive stamper 105, the photocurable resin 107 is cured. Then, as illustrated in FIG. 1E, the light transmissive stamper 105 is peeled from the multilayer optical recording medium substrate 106, whereby an information pattern 108 is formed on the photocurable resin 107.

The light transmissive stamper according to the present invention can be peeled with no residues remaining on the light transmissive stamper because the light transmissive auxiliary layer and the inorganic resist, which have a higher peelability from the photocurable resin, are exposed to the surface. Further, the light transmissive stamper according to the present invention, which is entirely formed of inorganic materials except for the light transmissive substrate, can be repeatedly used without being degraded by an ultraviolet ray. In addition, because the adhesion between the light transmissive auxiliary layer and the inorganic resist is large, the stamper can be prevented from being damaged when peeling the photocurable resin from the stamper.

Therefore, according to the present invention, there can be provided a light transmissive stamper which can be produced without the need of forming a release layer after the information pattern has been subjected to exposure and development, and without the need of using an electrocasting apparatus, a rear surface polishing apparatus, an injection molding machine, and an RIE apparatus. Further, there can be provided a light transmissive stamper which can be produced simply by film formation and exposure/development, can be repeatedly used, and has excellent durability.

EXAMPLES

Hereinafter, the production method of the light transmissive stamper and the production method of a multilayer optical recording medium using the light transmissive stamper according to the present invention will be described through detailed examples. The structure of the present invention is not limited thereto. Regarding the multilayer optical recording medium, a production method of an optical recording medium having two information recording surfaces L0 and L1 will be described as an example, but the present invention is not limited to the structure. Here, an information recording surface of the optical recording medium, which is formed on a side close to a recording/reproducing optical system, is represented by L1, and an information recording surface thereof, which is formed on a side apart from the recording/reproducing optical system, is represented by L0.

Example 1

First, a light transmissive stamper was produced.

As a light transmissive substrate, a quartz substrate having a thickness of 1 mm, an outer diameter of 120 mm, and an inner diameter of 15 mm was used. First, on the quartz substrate, a silicon nitride (SiN) is formed as a light transmissive auxiliary layer. An Si target was sputtered in an atmosphere of Ar gas at a flow rate of 43 sccm and an $N_2$ gas at a flow rate of 24 sccm, to thereby form an SiN film in a thickness of 25 nm.

Next, as an inorganic resist layer, a film of tungsten oxide (WO) having an oxygen content less than the stoichiometric oxygen content was formed. A tungsten (W) metal target was sputtered in an atmosphere of an Ar gas at a flow rate of 50 sccm and an $O_2$ gas at a flow rate of 20 sccm, to thereby form a WO film in a thickness of 23 nm.

Then, a light beam was converged on the inorganic resist, and light for exposure was moved in a radial direction of the quartz substrate while the quartz substrate was rotated, whereby the resist was subjected to exposure corresponding to an information pattern (pits or guide grooves) for an L1 layer. In this example, as conditions for exposing a data recording area, a light beam having a wavelength of 351 nm was used, the linear velocity was set to 2.0 m/s, the power was set to 4.4 mW, and a track pitch TP was set to 320 nm. In this case, the state of the tungsten oxide (WO) film used in this example, which has an oxygen content less than the stoichiometric oxygen content, is changed by the irradiation with the light for exposure. As a result, the WO functions as a positive resist in which an exposed part is to be etched by the development using an alkaline solution.

Then, the resist of the exposed part was removed (etched) by use of a tetramethyl ammonium hydroxide (TMAH) developer, and the development was performed until the surface of SiN serving as the light transmissive auxiliary layer was exposed, to thereby produce the light transmissive stamper.

The light transmissive stamper had, in a state after the development, a transmittance of 65% at the maximum with respect to light having a wavelength of 350 nm to 400 nm.

Next, a description is given of the production method of an optical recording medium using the light transmissive stamper according to Example 1 with reference to FIGS. 2A to 2G. FIGS. 2A to 2G are cross-sectional views illustrating a half of an optical recording medium, and center holes of a substrate and a stamper are omitted. All the steps are illustrated with an incident surface of a light beam for recording/reproduction facing downward.

Figure 2A:
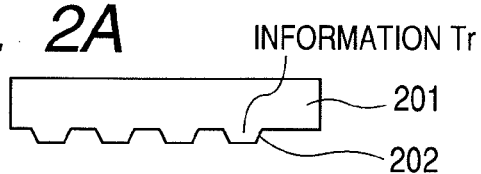
FIGS. 2A, 2B, 2C, 2D, 2E, 2F, and 2G are schematic cross-sectional views illustrating a production method of an optical recording medium according to Example 1 of the present invention.

First, as illustrated in FIG. 2A, by injection molding, a polycarbonate (PC) substrate 201 having a thickness of 1.1 mm, a diameter of 120 mm, a center hole diameter of 15 mm, and an information pattern 202 (pits or guide grooves) for the L0 layer formed therein was formed.

Figure 2B:
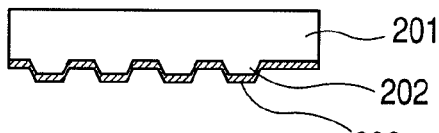

Then, as illustrated in FIG. 2B, on the information pattern 202 for the L0 layer, an L0 layer recording film 203 was formed. The L0 layer recording film 203 is typically constituted by or includes a reflective film which does not transmit light. In this example, an L0 reflective film, a dielectric film, an L0 recording film, and a dielectric film were formed in the mentioned order by using, for example, a sputtering method, whereby the L0 layer recording film 203 was formed.

Figure 2C:
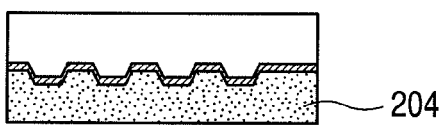

Next, as illustrated in FIG. 2C, an intermediate layer-forming photocurable resin 204 for forming an intermediate layer between the L0 layer and the L1 layer was applied in a thickness of 25 μm.

Figure 2D:
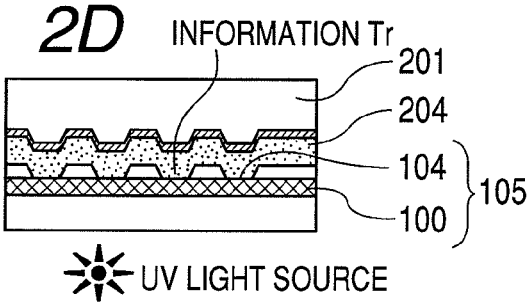

As illustrated in FIG. 2D, the light transmissive stamper 105 corresponds to the light transmissive stamper according to this example, and has recesses 104 corresponding to an information pattern (pits or guide grooves) for the L1 layer formed therein. Each information track has a recessed shape with respect to the stamper, and an SiN 100 serving as the light transmissive auxiliary layer is exposed. The polycarbonate substrate 201 applied with the intermediate layer-forming photocurable resin 204 was superimposed on the light transmissive stamper 105 in a direction in which the information pattern for the L0 layer faced the information pattern for the L1 layer. In this case, alignment thereof was performed using center holes (not illustrated). After that, an ultraviolet ray (UV) was irradiated from a UV light source through the light transmissive stamper 105, to thereby cure the intermediate layer-forming photocurable resin 204. The UV irradiation time necessary for curing the intermediate layer-forming photocurable resin 204 was less than 1 second.

Figure 2E:
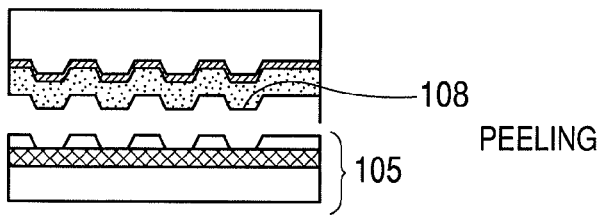

As illustrated in FIG. 2E, after the intermediate layer-forming photocurable resin 204 was cured, the light transmissive stamper 105 was peeled, thereby forming the information pattern 108 for the L1 layer. Since the light transmissive auxiliary layer and the inorganic resist each having good peelability are exposed to the surface, the light transmissive stamper according to the present invention can be peeled off with no residues remaining on the stamper. In addition, since the stamper is entirely constituted of inorganic materials, the stamper can be repeatedly used without being degraded by an ultraviolet ray.

Figure 2F:
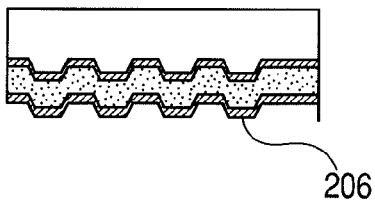

Then, as illustrated in FIG. 2F, on the information patterns 108 for the L1 layer, an L1 layer recording film 206 was formed. The L1 layer recording film 206 was formed of a translucent film, and an L1 high refractive index film, an L1 reflective film, an L1 dielectric film, an L1 recording film, and a dielectric film were formed in the mentioned order by, for example, a sputtering method.

Figure 2G:
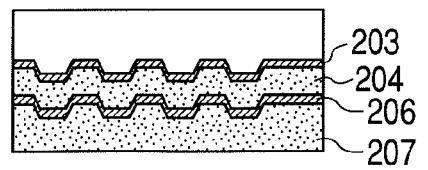
Figure 3A:
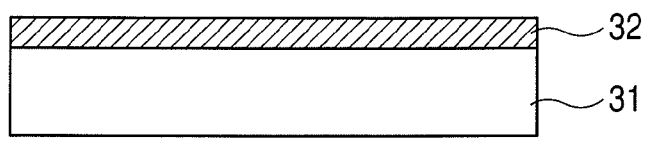
FIGS. 3A, 3B, 3C, 3D, and 3E are schematic cross-sectional views illustrating a production method of a light transmissive stamper formed of glass according to the related art.
Figure 3B:
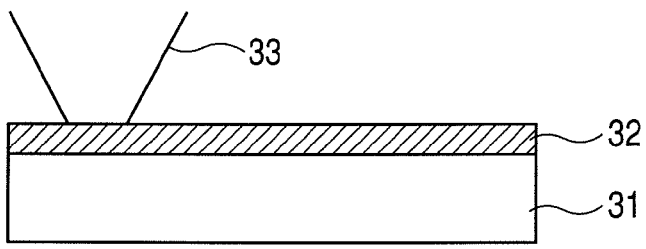
Figure 3C:
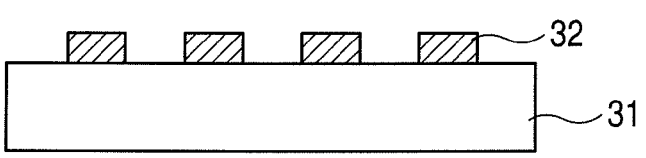
Figure 3D:
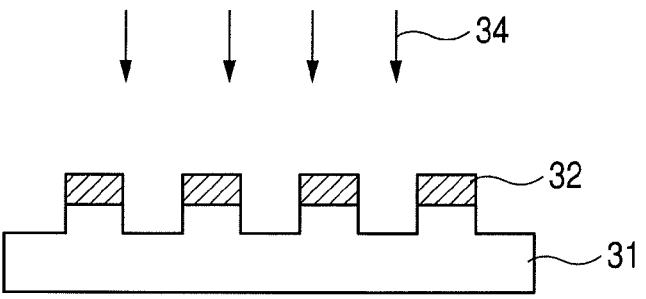
Figure 3E:
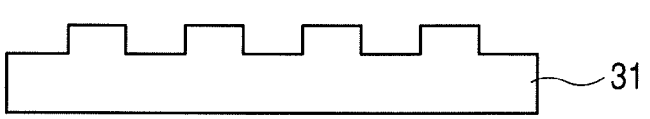

Then, as illustrated in FIG. 2G, on the L1 layer recording film 206, a cover layer forming-photocurable resin (resin protective layer) 207 was applied. The cover layer forming-photocurable resin 207 was coated in a thickness of 75 μm. After that, an ultraviolet ray from a UV light source was irradiated thereon to cure the cover layer forming-photocurable resin 207, to thereby produce a two-layered optical recording medium according to this example.

Evaluation of signal reproduction was performed with respect to the thus produced optical recording medium, by use of an optical system having a laser wavelength of 405 nm and an objective lens with NA of 0.85, at a linear velocity of 4.92 m/s, from the cover layer forming-photocurable resin 207 side. Incidentally, the evaluation was performed using random data of (1-7) modulation having a capacity of 25 GB. When equalization was performed using a limit equalizer to measure a data-to-clock jitter, the values of 5.5% in the L0 layer and 6.7% in the L1 layer were obtained.

Then, after 5,000 optical recording media were produced by use of the light transmissive tamper produced in this example, evaluation of signal reproduction was performed with respect to a 5,001-th produced optical recording medium. As a result, the data-to-data jitter of 5.5% in the L1 layer and 6.7% in the L1 layer were obtained.

In view of the above, it has been confirmed that there is no influence of residues and no defect over the entirety of the optical recording medium.

According to the production method of an optical recording medium according to this Example, by using the light transmissive stamper which can be simply produced and can be repeatedly used, a multilayer optical recording medium can be provided at low cost.

Example 2

In this example, a description is given of an example where a molybdenum oxide (MoO) is used for an inorganic resist layer. First, on a quartz substrate which is similar to the quartz substrate used in Example 1, a film of silicon nitride (SiN) is formed as a light transmissive auxiliary layer. An Si target was sputtered in an atmosphere of Ar gas at a flow rate of 43 sccm and $N_2$ gas at a flow rate of 24 sccm, to thereby form the SiN film in a thickness of 25 nm.

Next, as an inorganic resist layer, a film MoO that functions as a positive resist was formed. A molybdenum (Mo) metal target was sputtered in an atmosphere of Ar gas at a flow rate of 50 sccm and $O_2$ gas at a flow rate of 11.5 sccm, to thereby form the MoO film in a thickness of 25 nm.

In this example, as the conditions for exposing a data recording area, a light beam having a wavelength of 351 nm was used, the linear velocity was set to 2.0 m/s, the power was set to 2.5 mW, and the track pitch TP was set to 320 nm. Then, the resist of the exposed part was removed (etched) by use of a TMAH developer, and the development was performed until the surface of SiN serving as the light transmissive auxiliary layer was exposed, to thereby produce a light transmissive stamper.

The light transmissive stamper had, in a state after the development, a transmittance of 64% at the maximum with respect to light having a wavelength of 350 nm to 400 nm in a state.

Next, an optical recording medium was produced by following the same procedure as in Example 1 by use of the light transmissive stamper according to this example. When evaluation of signal reproduction was performed in a similar manner as in Example 1, characteristics equivalent to those of Example 1 were obtained.

Then, after 5,000 optical recording media were produced by the use of the light transmissive stamper produced in this example, evaluation of signal reproduction was performed with respect to a 5,001-th produced optical recording medium. As a result, it has been found that the characteristics were not degraded, and there was no influence of residues and no defect over the entirety of the optical recording medium.

Comparative Example 1

In this comparative example, a light transmissive stamper and an optical recording medium were produced by following the same procedure as in Example 1 with the exception that the light transmissive auxiliary layer was not formed.

First, on a quartz substrate similar to that used in Example 1, a film of tungsten oxide (WO) having an oxygen content less than the stoichiometric oxygen content was formed. A tungsten (W) metal target was sputtered in an atmosphere of Ar gas at a flow rate of 50 sccm and $O_2$ gas at a flow rate of 20 sccm, to thereby form the WO film in a thickness of 23 nm.

Then, a light beam was converged on the inorganic resist layer, and the light for exposure was moved in the radial direction of the quartz substrate while the quartz substrate was rotated, whereby the resist was subjected to exposure corresponding to an information pattern (pits or guide grooves) for the L1 layer was performed.

In this comparative example, as the conditions for exposing a data recording area, a light beam having a wavelength of 351 nm was used, the linear velocity was set to 2.0 m/s, the power was set to 4.6 mW, and the track pitch TP was set to 320 nm.

Then, the resist of an exposed part was removed (etched) by use of a TMAH developer, and the development was performed until the surface of the quartz substrate was exposed, to thereby produce the light transmissive stamper.

The light transmissive stamper had, in a state after the development, a transmittance of 72% at the maximum with respect to light having a wavelength of 350 nm to 400 nm.

Next, an optical recording medium was produced by following the same procedure as in Example 1 by the use of the light transmissive stamper according to this comparative example. When evaluation of signal reproduction was performed in a similar manner as in Example 1, characteristics equivalent to those of Example 1 were obtained.

However, after 5,000 optical recording media were produced, when evaluation of signal reproduction was performed with respect to a 5,001-th produced optical recording medium, the jitter was degraded to 7.5% in a part of the optical recording medium in the L1 layer, and was degraded to 9.0% in another part thereof. When the stamper was examined microscopically, in the area in which the jitter had been degraded to 7.5%, residues of the photocurable resin were found remaining in the recesses corresponding to the information tracks. Further, in the area in which the jitter had been degraded to 9.0%, there was found a defect due to peeling of a portion of the inorganic resist from the quartz substrate.

Example 3

In this example, a description is given of an example where a silicon oxide was used as a light transmissive auxiliary layer.

First, on a quartz substrate similar to that used in Example 1, a film of silicon oxide ($SiO_2$) was formed as a light transmissive auxiliary layer. An $SiO_2$ target was sputtered in an atmosphere of Ar gas at a flow rate of 40 sccm and $O_2$ gas at a flow rate of 10 sccm, to thereby form the $SiO_2$ film in a thickness of 10 nm.

Next, as a light transmissive inorganic layer, a film of WO that functions as the positive resist was formed in a thickness of 23 nm by following the same procedure as in Example 1.

In this example, as the conditions for exposing a data recording area, a light beam having a wavelength of 351 nm was used, the linear velocity was set to 2.0 m/s, the power was set to 4.6 mW, and the track pitch TP was set to 320 nm. Then, the resist of an exposed part was removed (etched) by use of a TMAH developer, and the development was performed until the surface of $SiO_2$ serving as the light transmissive auxiliary layer was exposed, to thereby produce the light transmissive stamper.

The light transmissive stamper had, in a state after the development, a transmittance of 70% at the maximum with respect to light having a wavelength of 350 nm to 400 nm.

Next, an optical recording medium was produced by following the same procedure as in Example 1 by the use of the light transmissive stamper according to this example. When evaluation of signal reproduction was performed in a similar manner as in Example 1, characteristics equivalent to those of Example 1 were obtained.

Then, after 5,000 optical recording media were produced by the use of the light transmissive tamper produced in this example, evaluation of signal reproduction was performed with respect to a 5,001-th produced optical recording medium. As a result, it has been found that the characteristics were not degraded, and there was no influence of residues and no defect over the entirety of the optical recording medium.

Example 4

In this example, a description is given of an example where titanium oxide was used for a light transmissive auxiliary layer.

First, on a quartz substrate similar to that used in Example 1, a film of titanium oxide ($TiO_2$) was formed as a light transmissive auxiliary layer. A $TiO_2$ target was sputtered in an atmosphere of an Ar gas at a flow rate of 50 sccm and an $O_2$ gas at a flow rate of 5 sccm, to thereby form the $TiO_2$ film in a thickness of 24 nm.

Next, as a light transmissive inorganic layer, a film of WO that functions as the positive resist was formed in a thickness of 23 nm by following the same procedure as in Example 1.

In this example, as the conditions for exposing a data recording area, a light beam having a wavelength of 351 nm was used, the linear velocity was set to 2.0 m/s, the power was set to 4.3 mW, and the track pitch TP was set to 320 nm. Then, the resist of an exposed part was removed (etched) by use of a TMAH developer, and the development was performed until the surface of $TiO_2$ serving as the light transmissive auxiliary layer was exposed, to thereby produce the light transmissive stamper.

The light transmissive stamper had, in a state after the development, a transmittance of 63% at the maximum with respect to light having a wavelength of 350 nm to 400 nm.

Next, an optical recording medium was produced by following the same procedure as in Example 1 by the use of the light transmissive stamper according to this example. When evaluation of signal reproduction was performed in a similar manner as in Example 1, characteristics equivalent to those of Example 1 were obtained.

Then, after 5,000 optical recording media were produced by use of the light transmissive tamper produced in this example, evaluation of signal reproduction was performed with respect to a 5,001-th produced optical recording medium. As a result, it has been found that the characteristics were not degraded, and there was no influence of residues and no defect over the entirety of the optical recording medium.

Example 5

Figure 6A:
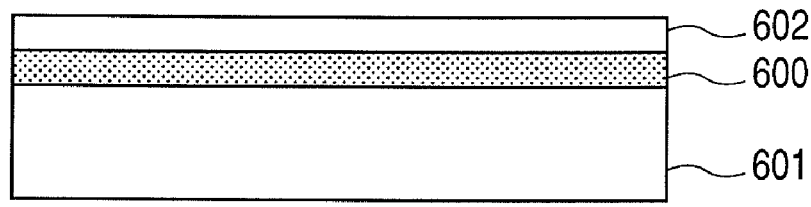
FIGS. 6A, 6B, and 6C are schematic cross-sectional views illustrating a production method of a light transmissive stamper according to Example 2 of the present invention.
Figure 6B:
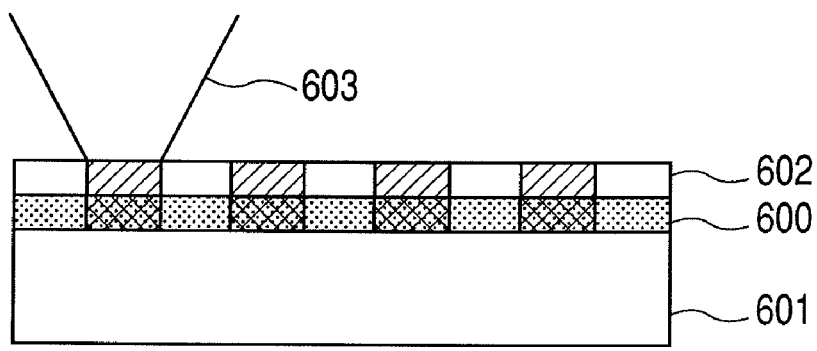
Figure 6C:
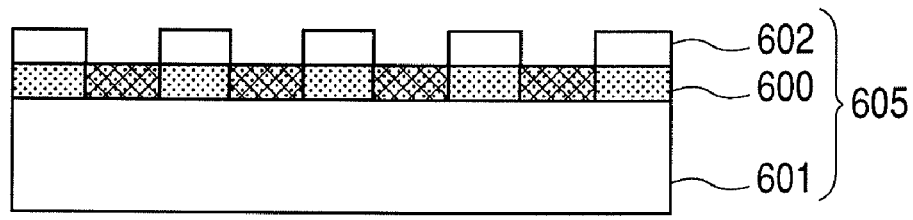

In this example, a description is given of an example where the inorganic resist layer and the light transmissive auxiliary layer are constituted by the same constituent elements, and have different compositional ratios, with reference to FIGS. 6A to 6C.

First, as illustrated in FIG. 6A, on a quartz substrate which is similar to that used in Example 1, a film of WO that functions as a negative resist was formed as a light transmissive auxiliary layer 600. A tungsten (W) metal target was sputtered in an atmosphere of Ar gas at a flow rate of 15 sccm and $O_2$ gas at a flow rate of 16 sccm, to thereby form the WO film in a thickness of 25 nm.

Next, as an inorganic resist layer 602, a film of WO that functions as a positive resist was formed. A tungsten (W) metal target was sputtered in an atmosphere of Ar gas at a flow rate of 50 sccm and $O_2$ gas at a flow rate of 20 sccm, to thereby form the WO film in a thickness of 23 nm.

Then, as illustrated in FIG. 6B, a light beam 603 was condensed on the resist, and the light for exposure was moved in the radial direction of the quartz substrate while the quartz substrate was rotated, whereby exposure corresponding to an information pattern (pits or guide grooves) was performed. In this example, as the conditions for exposing a data recording area, a light beam having a wavelength of 351 nm was used, the linear velocity was set to 2.0 m/s, the power was set to 4.5 mW, and the track pitch TP was set to 320 nm.

In this example, since the negative resist was used as the light transmissive auxiliary layer, a part irradiated with the light beam of the light transmissive auxiliary layer is also modified. Since the negative resist is used, the thus modified part will not be removed (etched) by the developer (or etched at a very small etch rate). For this reason, when development is performed using a TMAH developer, as illustrated in FIG. 6C, the modified part of the positive type inorganic resist layer 602 is removed (etched), and the etching is stopped (or the etch rate becomes very small) when the modified part of the light transmissive auxiliary layer that functions as a negative resist is exposed. Accordingly, a light transmissive stamper 605 having recesses with a uniform depth can be produced.

The light transmissive stamper had, in a state after the development, a transmittance of 66% at the maximum with respect to light having a wavelength of 350 nm to 400 nm.

Next, an optical recording medium was produced by following the method procedure as in Example 1 by the use of the light transmissive stamper according to this example. When evaluation of signal reproduction was performed in a similar manner as in Example 1, characteristics equivalent to those of Example 1 were obtained.

Then, after 5,000 optical recording media were produced by the use of the light transmissive stamper produced in this example, evaluation of signal reproduction was performed with respect to a 5,001-th produced optical recording medium. As a result, it has been found that the characteristics were not degraded, and there was no influence of residues and no defect over the entirety of the optical recording medium.

According to the production method of an optical recording medium according to this example, by merely using a single target and changing the flow rate of a sputtering gas, a light transmissive auxiliary layer and an inorganic resist layer can be formed, and there can be provided a light transmissive stamper which can be produced in simpler steps.

Example 6

In this example, a description is given of an example where a negative inorganic resist is used.

For the negative inorganic resist, the inorganic resist is modified by irradiation with a light beam. After that, an unmodified part is selectively removed by development, to thereby form an information pattern. Here, the modified part is hardly etched. Here, the surface properties of the inorganic resist in a region in which the film is removed by the developer are deteriorated, which may lead to degradation of a reproduced signal. Further, it is difficult to control the depths of recesses corresponding to an information pattern with an accuracy of several nm by adjusting the developing time. In this case, in the negative inorganic resist, the modified part is not etched and remains. However, since whether the shape corresponding to the information pattern formed in the inorganic resist is regarded as a protrusion or a recess is merely a difference in manner of expression, the shape will be uniformly expressed as a recess in this example.

Also in the case of a negative inorganic resist, in order to solve the above-mentioned problem, it is effective that the light transmissive auxiliary layer according to the present invention is provided. In order to solve the above-mentioned problem, on a substrate having light transmissivity, a light transmissive auxiliary layer and an inorganic resist layer having such a thickness as to provide a desired groove depth after the development are formed sequentially. Then, exposure is performed corresponding to the information pattern, and development is performed until the surface of the light transmissive auxiliary layer is exposed.

According to the present invention, since the unmodified part of the inorganic resist is removed to a level corresponding to the surface of the light transmissive auxiliary layer, degradation of a reproduced signal due to the deterioration of the surface properties does not occur. Further, the modified part of the inorganic resist is hardly etched. Accordingly, by removing the unmodified part to the level corresponding to the surface of the light transmissive auxiliary layer, the depth of the recesses corresponding to the information pattern can be controlled with an accuracy of several nm.

First, a light transmissive stamper is produced. First, on a quartz substrate which is similar to that used in Example 1, a light transmissive auxiliary layer was formed.

Next, a film of WO functioning as a negative resist is formed. A tungsten (W) metal target was sputtered in an atmosphere of Ar gas at a flow rate of 15 sccm and $O_2$ gas at a flow rate of 16 sccm, to thereby form the WO film in a thickness of 22 nm.

Then, a light beam was condensed on the inorganic resist layer, and the light for exposure was moved in the radial direction of the quartz substrate while the quartz substrate was rotated, whereby the exposure corresponding to the information pattern (pits or guide grooves) for the L0 layer was performed on the inorganic resist. In this example, as the conditions for exposing a data recording area, a light beam having a wavelength of 351 nm was used, the linear velocity was set to 2.0 m/s, the power was set to 4.6 mW, and the track pitch TP was set to 400 nm.

Then, the resist of an unexposed part was etched by use of a tetramethyl ammonium hydroxide (TMAH) developer, and the development was performed until the surface of SiN serving as the light transmissive auxiliary layer was exposed, to thereby produce the light transmissive stamper.

The light transmissive stamper had, in a state after the development, a transmittance of 75% at the maximum with respect to light having a wavelength of 350 nm to 400 nm.

Next, in this example, a light transmissive stamper according to the present invention, an L1-forming substrate which includes information tracks each having a recess shape, and an organic recording material were used to produce an optical recording medium.

A description is made of the optical recording medium with reference to FIGS. 7A to 7G. FIGS. 7A to 7G are schematic cross-sectional views illustrating one half of an optical recording medium, and the center hole of each of the substrate and the stamper is omitted. All the steps are illustrated with an incident surface of a light beam for recording/reproduction facing downward.

Figure 7A:
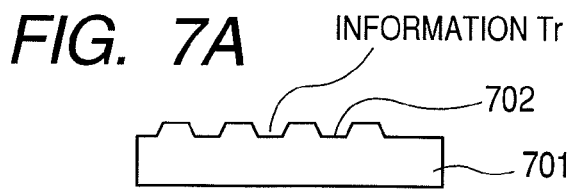
FIGS. 7A, 7B, 7C, 7D, 7E, 7F, and 7G are schematic cross-sectional views illustrating a production method of an optical recording medium according to Example 3 of the present invention.

First, as illustrated in FIG. 7A, by injection molding, a polycarbonate (PC) substrate 701 having a thickness of 0.6 mm, a diameter of 120 mm, and a center hole diameter of 15 mm, in which an information pattern 702 (pits or guide grooves) of the L1 layer were formed, was formed. Each information track has a recess shape with respect to the substrate.

Figure 7B:
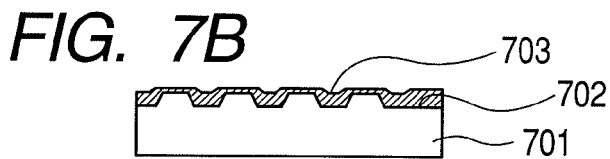

Next, as illustrated in FIG. 7B, on the information pattern 702 of the L1 layer, an L1 layer recording film 703 was formed. The L1 layer recording film was formed of a translucent film. An organic coloring matter-based L1 recording film was formed by, for example, a spin coating method, and then an L1 reflective film was formed by a sputtering method.

Figure 7C:
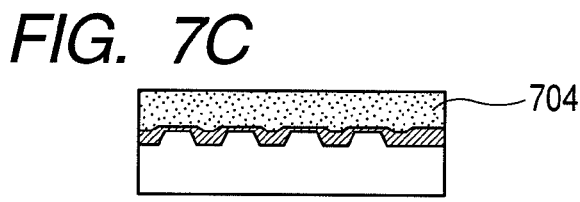

Next, as illustrated in FIG. 7C, a photocurable resin 704 for forming an intermediate layer between the L0 layer and the L1 layer was applied thereto in a thickness of 35 μm.

Figure 7D:

As illustrated in FIG. 7D, a light transmissive stamper 700 corresponds to the light transmissive stamper according to this example, and has an information pattern 705 (pits or guide grooves) for the L0 layer formed therein. Each information truck protrudes with respect to the stamper, and a light transmissive auxiliary layer 710 formed of SiN is exposed in the recesses. The polycarbonate substrate 701 having the intermediate layer-forming photocurable resin 704 applied thereto was superimposed on the light transmissive stamper 700 having the information pattern 705 for the L0 layer formed therein, in a direction in which the information pattern for the L0 layer faced the information pattern for the L1 layer. In this case, alignment thereof was performed using center holes (not illustrated). After that, an ultraviolet ray was irradiated through the light transmissive stamper 700, to thereby cure the intermediate layer-forming photocurable resin 704. The UV irradiation time necessary for curing the intermediate layer-forming photocurable resin 204 was less than 1 second.

Figure 7E:
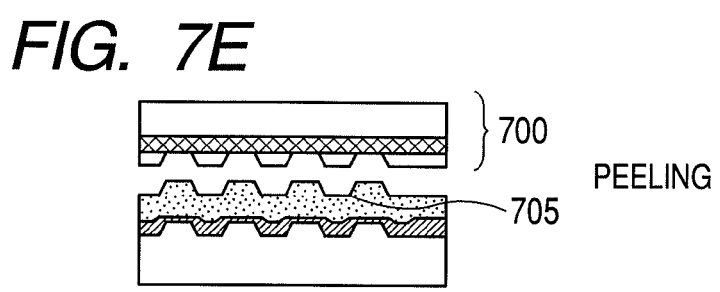

As illustrated in FIG. 7E, after the intermediate layer-forming photocurable resin 704 was cured, the light transmissive stamper 700 was peeled, to thereby form the information pattern 705 for the L1 layer. Since the light transmissive auxiliary layer and the inorganic resist each having good peelability are exposed to the surface, the light transmissive stamper according to the present invention can be peeled off with no residues remaining on the stamper. In addition, since the adhesion between the light transmissive auxiliary layer and the inorganic resist is excellent, a defect due to peeling of the information pattern of the inorganic resist does not occur. Further, the light transmissive stamper 700 peeled from the intermediate layer-forming photocurable resin 704 can be repeatedly used without being degraded by irradiation with UV light.

Figure 7F:
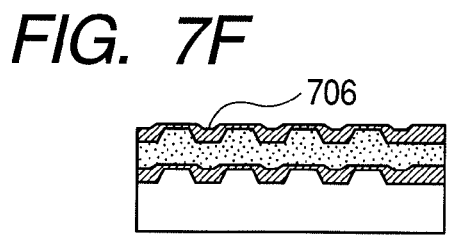

As illustrated in FIG. 7F, on the information pattern 705 of the L0 layer, an L0 layer recording film 706 was formed. The L0 layer recording film is typically constituted by or includes a reflective film which does not transmit light. According to this example, an organic coloring matter-based L0 recording film was formed by, for example, a spin coating method, and then an L0 reflective film was formed by employing a sputtering method.

Figure 7G:
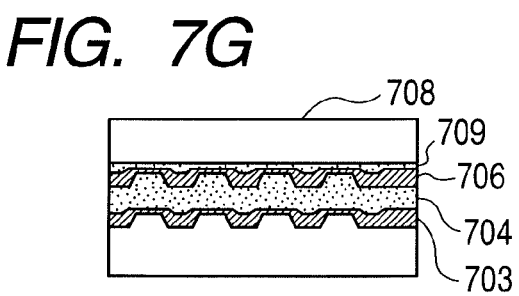

As illustrated in FIG. 7G, to the L0 layer recording film, a polycarbonate substrate 708 having a thickness of 0.6 mm was bonded by employing a UV curing adhesive 709, thereby producing a two-layered optical recording medium according to this example.

Evaluation of signal reproduction was performed with respect to the thus produced optical recording medium using an optical system having a laser wavelength of 405 nm and an objective lens with NA of 0.65, and employing ETM (8/12) modulation having a capacity of 15 GB from the polycarbonate substrate 701 side. When a simulated bit error rate (SbER) was measured, values of $4.2 \times 10^{-6}$ for the L0 layer and $7.0 \times 10^{-6}$ for the L1 layer were obtained.

Then, after 5,000 optical recording media were produced by the use of the light transmissive tamper produced in this example, the evaluation of signal reproduction was performed with respect to a 5,001-th produced optical recording medium. As a result, it has been found that the characteristics were not degraded, and there was no influence of residues and no defect over the entirety of the optical recording medium.

The production method of an optical recording medium according to the present invention is characterized by using a stamper in which: a light transmissive auxiliary layer and an inorganic resist layer are formed sequentially on a light transmissive substrate; a recess corresponding to an information pattern is formed in the inorganic resist layer; and the light transmissive auxiliary layer is exposed in the recess. The thickness and material of each layer of the light transmissive stamper, the number and stacking direction of the information recording surfaces of the optical recording medium, the recording material, and the like are not limited to those of the examples.

As described above, according to the present invention, there can be provided a light transmissive stamper which can be produced by a simple process including only exposure and development steps, has satisfactory shapes of pits or guide grooves, has good peelability from a photocurable resin, and can be repeatedly used for the production of a multilayer optical recording medium. Further, unlike a disposable stamper, the stamper according to the present invention can be repeatedly used, with the result that the production cost of the optical recording medium can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-112991, filed Apr. 23, 2007, which is hereby incorporated by reference herein in its entirety.

What is claimed is:

1. A method of producing a multilayer optical recording medium having a plurality of recording layers, comprising the steps of:
    a) forming a recording film on a substrate of an optical recording medium;
    b) applying a photocurable resin for forming an intermediate layer, onto the recording film;
    c) irradiating the photocurable resin for forming the intermediate layer with an ultraviolet ray through a light transmissive stamper to transfer an information pattern to the photocurable resin for forming the intermediate layer; and
    d) stacking a recording film on the photocurable resin for forming the intermediate layer,
    wherein the light transmissive stamper comprises a substrate having light transmissivity, an auxiliary layer having light transmissivity stacked on the substrate having light transmissivity, and an inorganic resist layer having light transmissivity stacked on the auxiliary layer,
    wherein peelability between the auxiliary layer and the photocurable resin is higher than peelability between the substrate having light transmissivity and the photocurable resin, and the inorganic resist layer has an uneven pattern formed therein corresponding to an information pattern, and the auxiliary layer having light transmissivity is exposed in a recess of the uneven pattern of the inorganic resist layer,
    wherein the inorganic resist layer contains, as a main component, any one of a tungsten oxide, a molybdenum oxide, and an oxide in which a part of tungsten of a tungsten oxide is substituted with molybdenum, each having an oxygen content less than the stoichiometric oxygen content of the oxide, and
    wherein the auxiliary layer comprises any one of a silicon nitride, a silicon oxide, a titanium oxide, and a mixture thereof.

* * * * *